United States Patent [19]

Shackle et al.

[11] Patent Number: 5,294,502

[45] Date of Patent: Mar. 15, 1994

[54] CYCLIC ETHERS, SOLID ELECTROLYTES CONTAINING SUCH ETHERS AND ELECTROLYTIC CELLS PRODUCED THEREFROM

[75] Inventors: Dale R. Shackle, Morgan Hill; Milton N. Golovin, San Jose; Joseph T. Lundquist, Gilroy; Benjamin Chaloner-Gill, Santa Clara, all of Calif.

[73] Assignee: Valence Technology, Inc., San Jose, Calif.

[21] Appl. No.: 42,325

[22] Filed: Apr. 2, 1993

[51] Int. Cl.$^5$ .............................................. H01M 6/18
[52] U.S. Cl. .................... 429/192; 429/194; 252/62.2
[58] Field of Search .............. 429/192, 191, 194, 218; 252/62.2; 204/421

[56] References Cited

U.S. PATENT DOCUMENTS

| | | | |
|---|---|---|---|
| 4,830,939 | 5/1989 | Lee et al. | 429/192 |
| 4,908,283 | 3/1990 | Takahashi et al. | 429/192 |
| 4,925,751 | 5/1990 | Shackle et al. | 429/191 |
| 4,990,413 | 2/1991 | Lee et al. | 429/191 |

OTHER PUBLICATIONS

M. B. Armand, *Current State of PEO-Based Electrolyte*, "Polymer Electrolyte Reviews", Elsevier Applied Science Publishers, Ltd., England (1987).

*Primary Examiner*—Anthony Skapars
*Attorney, Agent, or Firm*—S. Russell LaPaglia

[57] ABSTRACT

This invention is directed to solid electrolytes containing a solvent and, in particular, a solvent comprising certain substituted tetrahydrofurans, substituted 1,3-dioxolanes, substituted 1,4-dioxanes, and substituted tetrahydropyrans.

28 Claims, No Drawings

CYCLIC ETHERS, SOLID ELECTROLYTES CONTAINING SUCH ETHERS AND ELECTROLYTIC CELLS PRODUCED THEREFROM

BACKGROUND OF THE INVENTION

1. Field of the Invention

This invention is directed to solid electrolytes containing a solvent and, in particular, a solvent comprising a substituted cyclic ether, and optionally, an organic carbonate. This invention is further directed to solid electrolytic cells (batteries) containing an anode, a cathode and a solid electrolyte containing a solvent comprising a substituted cyclic ether. This invention is also directed to methods for enhancing the cycling efficiency of the solid electrolytic cells by employing a solid electrolyte which contains a solvent comprising a substituted cyclic ether.

2. State of the Art

Electrolytic cells containing an anode, a cathode and a solid, solvent-containing electrolyte are known in the art and are usually referred to as "solid batteries". These cells offer a number of advantages over electrolytic cells containing a liquid electrolyte (i.e., "liquid batteries") including improved safety features. Notwithstanding their advantages, the use of these solid batteries over repeated charge/discharge cycles is substantially impaired because these batteries typically exhibit significant drops in their charge and discharge capacity over repeated cycles as compared to their initial charge and discharge capacity.

Specifically, solid batteries employ a solid electrolyte inerposed between a cathode and an anode. The solid electrolyte contains either an inorganic or an organic matrix as well as a suitable inorganic salt. The inorganic matrix may be nonpolymeric [e.g., $\beta$-alumina, silicon dioxide, lithium iodide, etc.] or polymeric [e.g., inorganic (polyphosphazene) polymers] whereas the organic matrix is typically polymeric. Suitable organic polymeric matrices are well known in the art and are typically organic polymers obtained by polymerization of a suitable organic monomer as described, for example, in U.S. Pat. No. 4,908,283. Suitable organic constituents include, by way of example, polyethylene oxide, polypropylene oxide, polyethyleneimine, polyepichlorohydrin, polyethylene succinate, and an acryloyl-derivatized polyalkylene oxide containing an acryloyl group of the formula $CH_2=CR'C(O)O-$ where $R'$ is hydrogen or lower alkyl of from 1-6 carbon atoms.

Because of their expense and difficulty in forming into a variety of shapes, inorganic non-polymeric matrices are generally not preferred and the art typically employs a solid electrolyte containing a polymeric matrix. Nevertheless, electrolytic cells containing a solid electrolyte containing a polymeric matrix suffer from low ion conductivity and, accordingly, in order to maximize the conductivity of these materials, the matrix is generally constructed into a very thin film, i.e., on the order of about 25 to about 250 $\mu$m. As is apparent, the reduced thickness of the film reduces the total amount of internal resistance within the electrolyte thereby minimizing losses in conductivity due to internal resistance.

The solid electrolytes may also contain a solvent (plasticizer) which is typically added to the matrix in order to enhance the solubility of the inorganic salt in the solid electrolyte and thereby increase the conductivity of the electrolytic cell.

Suitable solvents well known in the art for use in such solid electrolytes include, by way of example, propylene carbonate, ethylene carbonate, $\gamma$-butyrolactone, tetrahydrofuran, glyme (dimethoxyethane), diglyme, tetraglyme, dimethylsulfoxide, dioxolane, sulfolane and the like.

The solid, solvent-containing electrolyte is typically formed in one of two methods. In one method, the solid matrix is first formed and then a requisite amount of this material is dissolved in a volatile solvent. Requisite amounts of the inorganic salt and the electrolyte solvent are then added to the solution. This solution is then placed on the surface of a suitable substrate (e.g., the surface of a cathode) and the volatile solvent is removed to provide for the solid electrolyte.

In the other method, a monomer or partial polymer of the polymeric matrix to be formed is combined with appropriate amounts of the inorganic salt and the solvent. This mixture is then placed on the surface of a suitable substrate (e.g., the surface of the cathode) and the monomer is polymerized or cured (or the partial polymer is then further polymerized or cured) by conventional techniques (heat, ultraviolet radiation, electron beams, etc.) so as to form the solid, solvent-containing electrolyte.

When the solid electrolyte is formed on a cathodic surface, an anodic material can then be laminated onto the solid electrolyte to form a solid battery (i.e., an electrolytic cell).

Notwithstanding the above, the initial capacity of solid batteries is often less than desirable. Moreover, even when the initial capacity of the solid battery is relatively high, such solid batteries often exhibit rapid decline in capacity over their cycle life. The lithium anode in such a cell may undergo a slow chemical change thereby limiting the cell's cycle life.

Specifically, the cumulative capacity of a solid battery is the summation of the capacity of a solid battery over each cycle (charge and discharge) in a specified cycle life. Solid batteries having a high initial capacity but which rapidly lose capacity over the cycle life will have low cumulative capacity which limits the effectiveness of these batteries for repeated use.

Secondary batteries can be recharged because they incorporate highly reversible chemical-electrochemical reactions to generate electrical energy. However, there are limits to how many times a battery can be recharged; and when the battery no longer has a reasonable recharge capacity (amp hours) or becomes unchargeable, it is considered to have failed. Reasons for such failures include corrosion, loss of active material on the electrode by mechanical failure, electrolyte erosion of active material, dissolution and nonredeposition of active material, and formation of inactive or nonconducting species.

A particular difficulty with electrolytic solvents heretofore used in solid solvent-containing electrolytes is their volatility and low flash points. Examples of such known solvents include dioxolane and tetrahydrofuran (THF). THF, for example, boils at 65° C. and has a much lower flash point. Safety considerations require a search for lower volatility solvents which maintain or surpass the favorable performance of known solvents for solid solvent-containing electrolytes such as dioxolane.

In view of the above, the art is searching for methods to safely enhance the cumulative capacity of such solid batteries. It goes without saying that increases in the cumulative capacity of solid batteries would greatly facilitate their widespread commercial use.

SUMMARY OF THE INVENTION

The present invention is directed, in part, to the discovery that the use of a certain class of cyclic ethers as solvent in solid solvent-containing electrolytes provides for enhanced cumulative capacity or cycle life when these electrolytes are used in solid batteries. The solvents of the present invention are used alone or in combination, i.e. mixtures, with other compatible solvents in solid electrolytes.

Accordingly, in one aspect, this invention is directed to a solid solvent-containing electrolyte which comprises:
a solid polymeric matrix;
an inorganic salt; and
a solvent represented by Formula I:

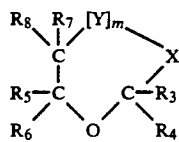  I wherein m is an integer from 0 to 1;
X is selected from the group consisting of oxygen and $-(CR_1R_2)-$;
Y is selected from the group consisting of oxygen and $-(CR_9R_{10})-$, with the proviso that when Y is oxygen, X is $-(CR_1R_2)-$;
$R_1$, $R_3$, $R_5$, $R_7$ and $R_9$ are hydrogen and $R_2$, $R_6$, $R_8$ and $R_{10}$ are independently selected from the group consisting of hydrogen, alkyl and alkoxy of from 1 to 4 carbon atoms; and
$R_4$ is selected from the group consisting of hydrogen, alkyl and alkoxy of from 1 to 4 carbon atoms, and $-CH_2O[CH_2CH_2O]_nCH_3$ where n is an integer from 0 to 3, with the proviso that when m=0 at least one of $R_2$, $R_4$, $R_6$ and $R_8$ is higher alkyl when $R_4$ is not $-CH_2O[CH_2CH_2O]_nCH_3$.

In another of its compositional aspects, the invention is directed to the use of substituted tetrahydrofurans, and substituted 1,3-dioxolanes as solvent in solid solvent-containing electrolytes comprising:
a solid polymeric matrix;
an inorganic salt; and
a solvent represented by Formula II:

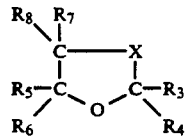  II wherein X is selected from the group consisting of oxygen and $-(CR_1R_2)-$;
$R_1$, $R_3$, $R_5$ and $R_7$ are hydrogen, and $R_2$, $R_6$ and $R_8$ are independently selected from the group consisting of hydrogen and alkyl of from 1 to 4 carbon atoms; and
$R_4$ is selected from the group consisting of hydrogen, alkyl of from 1 to 4 carbon atoms and $-CH_2O[CH_2CH_2O]_nCH_3$ where n is an integer from 0 to 3, with the proviso that at least one of $R_2$, $R_4$, $R_6$ and $R_8$ is higher alkyl when $R_4$ is not $-CH_2O[CH_2CH_2O]_nCH_3$.

In another aspect, the invention is directed to the use of substituted 1,3-dioxolanes as solvents in solid solvent-containing electrolytes comprising:
a solid polymeric matrix;
an inorganic salt; and
a solvent represented by Formula III:

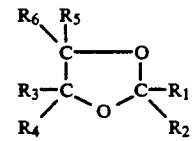  III where in $R'_1$, $R'_3$ and $R'_5$ are hydrogen, and $R'_4$ and $R'_6$ are independently selected from the group consisting of hydrogen and alkyl of from 1 to 4 carbon atoms;
$R'_2$ is selected from the group consisting of hydrogen, alkyl of from 1 to 4 carbon atoms, and $-CH_2O[CH_2CH_2O]_nCH_3$, where n is an integer of from 0 to 3;
with the proviso that at least one of $R'_2$, $R'_4$ and $R'_6$ in higher alkyl when $R'_2$ is not $-CH_2O[CH_2CH_2O]_nCH_3$.

In another compositional aspect, the invention is directed to the use of substituted tetrahydrofurans as solvents in solid solvent-containing electrolytes comprising:
a solid polymeric matrix;
an inorganic salt; and
a solvent represented by Formula IV:

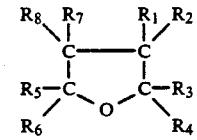  IV wherein $R_1$, $R_3$, $R_5$ and $R_7$ are hydrogen, and $R_2$, $R_6$ and $R_8$ are independently selected from the group consisting of hydrogen, alkyl and alkoxy of from 1 to 4 carbon atoms;
$R_4$ is selected from the group consisting of hydrogen, alkyl of from 1 to 4 carbon atoms, and $-CH_2O[CH_2CH_2O]_nCH_3$, where n is an integer of from 0 to 3, with the proviso that at least one of $R_2$, $R_4$, $R_6$ and $R_8$ is higher alkyl when $R_4$ is not $-CH_2O[CH_2CH_2O]_nCH_3$.

In yet another compositional aspect, the invention is directed to the use of substituted 1,4-dioxanes (1,4-dioxacyclohexanes) and substituted tetrahydropyrans (1-oxacyclohexanes) as solvents in solid solvent-containing electrolytes comprising:
a solid polymeric matrix;
an inorganic salt; and
a solvent represented by Formula V:

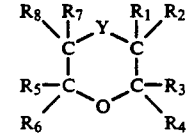  V wherein Y is selected from the group consisting of oxygen and $(CR_9R_{10})$;
wherein $R_1$, $R_3$, $R_5$, and $R_7$ and $R_9$ are hydrogen and $R_2$, $R_4$, $R_6$, $R_8$ and $R_{10}$ are independently selected from the group consisting of hydrogen, alkyl and alkoxy of from 1 to 4 carbon atoms and —CH$_2$O[CH$_2$CH$_2$O]$_n$CH$_3$, where n is an integer from 0 to 3, with the proviso that at least one of R$_2$, R$_4$, R$_6$, R$_8$ and R$_{10}$ is —CH$_2$O[CH$_2$CH$_2$O]$_n$CH$_3$.

In yet another embodiment of the compositions of this invention, the invention is directed to the use of the 1,4-dioxane diether of Formula VI as a solvent in a solvent-containing solid electrolyte.

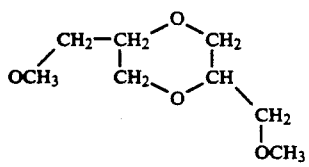

VI

In addition to the solvents of Formulas I–VI, the solvent in the solid solvent-containing electrolyte may comprise 10 to 95% by weight of an organic carbonate.

In addition to the solvents of Formulas I–VI, the solvent in the solvent-containing electrolyte may comprise 5 to 50% by weight of a glyme selected from the group consisting of glyme, diglyme, and tetraglyme. A preferred solvent comprises a solvent mixture of solvents represented by Formulas I–VI, an organic carbonate and a selected glyme.

In yet another aspect of this invention, an electrolytic cell comprises:
an anode containing a compatible anodic material;
a cathode containing a compatible cathodic material; and
a solid electrolyte functionally disposed between said anode and said cathode, said solid electrolytic comprising:
a solid polymeric matrix;
an inorganic salt; and
a solvent represented by Formulas I–VI.

In yet another aspect of the invention, there is a method of increasing the cycle lifetime, or cumulative capacity, of a solid electrolytic cell and batteries composed of such cells, by selecting a solid electrolyte comprising:
a solid polymeric matrix;
an inorganic salt; and
a solvent represented by Formulas I–VI.

In yet another aspect of the invention, the cathode is prepared from a cathode paste which comprises about 35 to 65 weight percent of a compatible cathodic material; about 1 to 20 weight percent of an electroconductive agent; about 0 to 20 weight percent of polyethylene oxide having a molecular weight of at least 100,000; at least about 5 to 30 weight percent of a solid matrix forming monomer or partial polymer thereof, and 10 to 50 weight percent of the solvents heretofore described including solvents represented by Formulas I–VI.

Preferably, the solid polymeric matrix is an organic matrix derived from a solid matrix forming monomer or partial polymer thereof.

DETAILED DESCRIPTION OF THE PREFERRED EMBODIMENTS

As noted above, this invention is directed to solid, solvent-containing electrolytes which, by virtue of the solvent employed, provide for enhanced capacity when used in a solid battery. However, prior to describing this invention is further detail, the following terms will first be defined.

Definitions

As used herein, the following terms have the following meanings.

The term "higher alkyl" consists of C$_2$ and higher carbon number alkyls.

The term "solid polymeric matrix" refers to an electrolyte compatible material formed by polymerizing an inorganic or organic monomer (or partial polymers thereof) and which, when used in combination with the other components of the electrolyte, renders the electrolyte solid. The solid matrix may or may not be ion-conducting.

Suitable solid polymeric matrices are well known in the art and include solid matrices formed from inorganic polymers, organic polymers or a mixture of polymers with inorganic non-polymeric materials.

Preferably, the solid polymeric matrix is an organic matrix derived from a solid matrix forming monomer and from partial polymers of a solid matrix forming monomer.

Alternatively, the solid polymeric matrix can be used in combination with a non-polymeric inorganic matrix. See, for example, U.S. Pat. No. 4,990,413 which is incorporated herein by reference in its entirety. Suitable non-polymeric inorganic materials for use in conjunction with the solid polymeric matrix include, by way of example, β-alumina, silicon dioxide, lithium iodide, and the like. Suitable inorganic monomers are also disclosed in U.S. Pat. Nos. 4,247,499; 4,388,385; 4,414,607; 4,394,280; 4,432,891; 4,539,276; and 4,557,985 each of which is incorporated herein by reference.

The term "a solid matrix forming monomer" refers to inorganic or organic materials which in monomeric form can be polymerized, preferably in the presence of an inorganic ion salt and a solvent mixture of an organic carbonate and a compound of Formula I above, to form solid matrices which are suitable for use as solid electrolytes in electrolytic cells. Suitable solid matrix forming monomers are well known in the art and the particular monomer employed is not critical. Preferably, the solid matrix forming monomers have at least one hetero atom capable of forming donor acceptor bonds with inorganic cations (e.g., alkali ions). When polymerized, these compounds can form an ionically conductive matrix.

Examples of suitable organic solid matrix forming monomers include, by way of example, propylene oxide, ethyleneimine, ethylene oxide, epichlorohydrin, acryloyl-derivatized polyalkylene oxides (as disclosed in U.S. Pat. No. 4,908,283), vinyl sulfonate polyalkylene oxides (as disclosed in U.S. patent application Ser. No. 07/918,438, filed Jul. 22, 1992, now U.S. Pat. No. 5,262,253 which is filed concurrently herewith and entitled "SOLID ELECTROLYTES DERIVED BY POLYMERIZATION OF VINYL SULFONATE POLYALKYLENE OXIDES" which application is incorporated herein by reference in its entirety), and the like as well as mixtures thereof.

Examples of suitable inorganic solid matrix forming monomers include, by way of example, phosphazenes and siloxanes. Phosphazene monomers and the resulting polyphosphazene solid matrix are disclosed by Abraham et at., Proc. Int. Power Sources Symp., 34th, pp. 81–83 (1990) and by Abraham et al., J. Electrochemical Society, Vol. 138, No. 4, pp. 921–927 (1991).

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized, preferably in the presence of an inorganic ion salt and a solvent mixture comprising compounds of Formulas I–VI above, to form solid polymeric matrices which are suitable for use as solid electrolytes in electrolytic cells.

The term "cured" or "cured product" refers to the treatment of the solid matrix forming monomer or partial polymer thereof under polymerization conditions (including cross-linking) so as to form a solid polymeric matrix. Suitable polymerization conditions are well known in the art and include by way of example, heating the monomer, irradiating the monomer with UV light, electron beams, etc. The resulting cured product preferably contains repeating units containing at least one hetero atom such as oxygen or nitrogen which is capable of forming donor acceptor bonds with inorganic cations (alkali ions). Examples of suitable cured products suitable for use in this invention are set forth in U.S. Pat. Nos. 4,830,939 and 4,990,413 which are incorporated herein by reference in their entirety.

The solid matrix forming monomer or partial polymer can be cured or further cured prior to or after addition of the inorganic salt and the solvent. For example, a composition comprising requisite amounts of the solid matrix forming monomer, inorganic ion salt and solvent can be applied to a substrate and then cured. Alternatively, the solid matrix forming monomer can be first cured and then dissolved into a suitable volatile solvent. Requisite amounts of the inorganic ion salt and solvent of the present invention can then be added. The mixture is then placed on a substrate and removal of the volatile solvent results in formation of a solid electrolyte. In either case, the resulting solid electrolyte is a homogeneous, single phase product which is maintained upon curing, and does not readily separate upon cooling to temperatures below room temperature. Accordingly, the solid electrolyte of this invention does not include a separator as is typical of liquid electrolytes.

The term "inorganic salt" refers to any inorganic salt which is suitable for use in a solid electrolyte. The particular inorganic salt employed is not critical and examples of suitable inorganic ion salts include, by way of example, LiClO$_4$, LiI, LiSCN, LiBF$_4$, LiAsF$_6$, LiCF$_3$SO$_3$, LiPF$_6$, NaI, NaSCN, KI, CsSCN, AgNO$_3$, CuCl$_2$, Mg(ClO$_4$)$_2$ and the like. The inorganic salt preferably contains at least one atom selected from the group consisting of Li, Na, K, Cs, Ag, Cu and Mg.

The term "organic carbonate" refers to hydrocarbyl carbonate compounds of no more than about 12 carbon atoms and which do not contain any hydroxyl groups. Preferably, the organic carbonate is a cyclic or an aliphatic carbonate.

The term "electrolytic cell" refers to a composite containing an anode, a cathode and an ion-conducting electrolyte interposed therebetween.

The anode is typically comprised of a compatible anodic material which is any material which functions as an anode in a solid electrolytic cell. Such compatible anodic materials are well known in the art and include, by way of example, lithium, lithium alloys, such as alloys of lithium with aluminum, mercury, nickel, zinc, and the like, and intercalation based anodes such as carbon, WO$_3$, and the like.

The cathode is typically comprised of a compatible cathodic material (for example, insertion compounds) which is any material which functions as a positive pole in a solid electrolytic cell. Such compatible cathodic materials are well known in the art and include, by way of example, manganese dioxide, molybdenum trioxide, vanadium pentaoxide, sulfides of titanium and niobium, chromium oxide, copper oxide, V$_6$O$_{13}$, lithiated manganese oxides, lithiated cobalt oxides and the like. The particular compatible cathodic material employed is not critical.

In one preferred embodiment, the compatible cathodic material is mixed with an electroconductive material including, by way of example, graphite, powdered carbon, powdered nickel, metal particles, conductive polymers (i.e., characterized by a conjugated network of double bonds like polypyrrole, polythiophenyl, polyaniline and polyacetylene), and the like, and a binder such as poly(tetrafluoroethylene) to form under pressure a positive cathodic plate.

In another preferred embodiment, the cathode is prepared from a cathode paste which comprises from about 35 to 65 weight percent of a compatible cathodic material; from about 1 to 20 weight percent of an electroconductive agent; from about 0 to 20 weight percent of polyethylene oxide having a number average molecular weight of at least 100,000; from about 10 to 50 weight percent of solvent comprising a 10:1 to 1:10 mixture of an organic carbonate and a of Formula I–VI above; and from at least about 5 weight percent to about 30 weight percent of a solid matrix forming monomer or partial polymer thereof. (All weight percents are based on the total weight of the cathode.)

The cathode paste is typically spread onto a suitable support such as a current collector and then cured by conventional methods to provide for a solid positive cathodic plate. The cathode (excluding the support) generally has a thickness of about 20 to about 150 microns.

Current collectors are well known in the art some of which are commercially available. A particularly preferred current collector for the cathode is a roughened nickel (electrolytically deposited nickel) on nickel current collector (available as CF18/NiT from Fukuda Metal Foil & Powder Company, Ltd., Kyoto, Japan). The current collectors are preferably attached to the surface of the cathode not facing the electrolyte but can also be attached to the anode. When the current collector is attached to the cathode, the cathode is interposed between the electrolyte and the current collector.

In still another preferred embodiment, the electrolyte solvent and the cathode solvent are identical.

In still another preferred embodiment, the cathode polymers and the electrolyte polymers are identical.

Methodology

Methods for preparing solid, solvent-containing electrolytes are well known in the art. This invention, however, utilizes a particular solvent (plasticizer) in the preparation of solid electrolytes which solvent provides unexpected enhancements in the capacity of solid electrolytic cells utilizing these solid electrolytes. The solvent employed herein comprises any solvent represented by Formulas I–VI and mixtures thereof, including mixtures with compatible solvents for solvent-containing electrolytes such as organic carbonates and selected glymes. Such other compatible solvents may comprise from 10 to 90% by weight of the total solvent.

The substituted-tetrahydrofurans; substituted 1,3-dioxolanes; substituted 1,4-dioxanes; and the substituted tetrahydropyrans which find use within the scope of the present invention can be prepared by art recognized methods. In the following, reference is made to the standard texts: Noller, "Chemistry of Organic Compounds", 3rd Edition, W. B. Saunders Company, Philadelphia ("Noller"); and Buehler and Pearson, "Survey of Organic Synthesis", Wiley & Sons, Inc., New York ("Buehler et al.").

Ether linkages are generally made by the Williamson synthesis in which an alcohol moiety is reacted with sodium to produce an alkoxide ion. The latter displaces a halide atom from an alkyl halide moiety to produce the ether linkage (Buehler et al, p. 330–410, Noller, p. 159). An alcohol reacts with alkylene oxide to produce a polyether alcohol, as in:

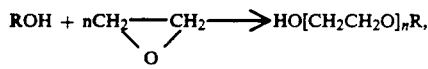

where R may be CH$_3$OH, C$_2$H$_5$OH, etc. (Noller p. 819). Of particular interest is the methoxypolyethylene oxide alcohol, which when halogenated, reacts via the Williamson synthesis with alcohol (i.e. hydroxymethyl ring substituents) to provide the polyether functionality required in Formulas I-V. Of course, other ethercapped polyethylene oxide alcohols may find use within the scope of the present invention, such as ethoxypolyethylene oxide alcohol and phenoxypolyethylene oxide alcohol.

Commercially available furfuryl alcohol is hydrogenated to tetrahydrofurfuryl alcohol (by H$_2$/Ni) (Noller, p. 665-6). The furfuryl alcohol is treated with metallic sodium and converted to the polyether as previously described. The substituted-tetrahydrofurans of the present invention (Formulas I, II, IV) are also made by the cyclization of substituted 1,4-diketones (Noller p. 665, 845) in the presence of concentrated acid to produce substituted furans. The latter may be hydrogenated (H$_2$/Ni) and functionalized with polyethers as heretofore described.

The substituted-tetrahydropyrans of Formulas I, II and IV are made by reactions analogous to the production of 2-methoxytetrahydropyran; which begins with the cyclodimerization of acrolein to yield 2-formyl-2,3-dihydropyran. The latter is hydrogenated to 2-hydroxymethyl-tetrahydropyran (Noller p. 682). The hydroxymethy group is converted to the polyether functionality as previously described. Tetrahydropyrans are also produced via the cycloaddition of dienes to an aldehyde (Buehler et al. p. 327).

The substituted 1,3-dioxolanes of Formulas I-III are made by the vapor phase catalytic dehydrogenation (cycloaddition) of 1,2-glycols to yield 2-hydroxymethyl-1,3-dioxolanes. The 2-hydroxymethyl group is converted to the polyether functionality as previously described. Substituted 1,3-dioxolanes are also made by the acid catalyzed reaction of 1,2-glycols with aldehydes and ketones (Noller p. 816) and with acetals (Salomaa et al., "Chemistry of the Hydroxyl Group", Part I, p. 458-63, New York 1970).

The substituted 1,4-dioxanes represented by Formulas I and V may be made by the acid catalyzed dehydration of 1,2-glycols (cycloaddition) (Noller p. 695), or by the reaction of substituted ethylene dibromide with the disodium salt of a 1,2-glycol.

The substituted 1.4-dioxane represented by Formula VI may be made by the dehydration of monomethoxylated glycerol.

The solid, solvent-containing electrolyte is then preferably prepared by combining a solid matrix forming monomer with an inorganic ion salt and the solvent. The resulting composition is then uniformly coated onto a suitable substrate (e.g., aluminum foil, a glass plate, a lithium anode, a cathode, etc.) by means of a roller, a doctor blade, a bar coater, a silk screen or spinner to obtain a film of this composition or its solution. In some cases, it may be necessary to heat the composition so as to provide for a coatable material.

Preferably, the amount of material coated onto the substrate is an amount sufficient so that after curing, the resulting solid, solvent-containing electrolyte has a thickness of no more than about 250 microns ($\mu$m). Preferably, the solid, solvent-containing electrolyte has a thickness of from about 10 to about 250 microns, more preferably from about 20 to about 150 microns, and even more preferably from about 25-50 microns.

The electrolyte composition typically comprises from about 5 to about 25 weight percent of an inorganic ion salt based on the total weight of the electrolyte; preferably, from about 8 to 15 weight percent.

The electrolyte composition typically comprises from about 40 to about 80 weight percent solvent based on the total weight of the electrolyte; preferably from about 60 to about 80 weight percent; and even more preferably about 70 weight percent.

The solid electrolyte composition typically comprises from about 5 to about 30 weight percent of the solid polymeric matrix based on the total weight of the electrolyte; preferably from about 12 to about 25 weight percent; and even more preferably about 17-20 weight percent.

In a preferred embodiment, the electrolyte composition further comprises a small amount of a film forming agent. Suitable film forming agents are well known in the art and include, by way of example, polyethylene oxide, polypropylene oxide, copolymers thereof, and the like, having a numbered average molecular weight of at least about 100,000. Preferably, the film forming agent is employed in an amount of about 1 to about 10 weight percent and more preferably at about 2.5–3.5 weight percent based on the total weight of the electrolyte composition.

The composition is cured by conventional methods to form a solid film. For example, when the solid matrix forming monomer contains a reactive double bond, suitable curing methods include heating, irradiation with UV radiation, irradiation with electron beams (EB), etc. When the composition is cured by heating or UV radiation, the composition preferably contains an initiator. For example, when curing is by heating, the initiator is typically a peroxide such as benzoyl peroxide, methyl ethyl ketone peroxide, t-butyl peroxypyvarate, diisopropyl peroxycarbonate, and the like). When curing is by UV radiation, the initiator is typically benzophenone, Darocur® 1173 (Ciby Geigy, Ardlesy, New York), and the like.

The initiator is generally employed in an amount sufficient to catalyze the polymerization reaction. Preferably, the initiator is employed at up to about 1 weight percent based on the weight of the solid matrix forming monomer.

When curing is by EB treatment, an initiator is not required.

In an alternative embodiment, the solid polymeric matrix (e.g., formed by polymerization of a solid matrix forming monomer) can be dissolved into a suitable volatile solvent and the requisite amounts of the inorganic salt and solvent of Formulas I–VI then added. The mixture is then applied onto a suitable substrate (e.g., the surface of the cathode opposite to the current collector) in the manner set forth above and the volatile solvent removed by conventional techniques to provide for a solid electrolyte. Suitable volatile solvents preferably have a boiling point of less than 85° C. and more preferably between about 45° and 85° C. Particularly preferred volatile solvents are aprotic solvents. Examples of suitable volatile solvents include acetonitrile, tetrahydrofuran, and the like. However, acetonitrile is not preferred if it is to contact the anode.

In either case, the resulting solid electrolyte is a homogeneous, single phase material which is maintained upon curing, and does not readily separate upon cooling to temperatures below room temperature. See, for example, U.S. Pat. No. 4,925,751 which is incorporated herein by reference in its entirety.

Additionally, it is desirable to avoid the use of any protic materials which will be incorporated into the battery. for example, most of the protic inhibitors in di- and triacrylate monomers as well as in the urethane acrylate prepolymers are preferably removed prior to formation of the cathode and/or electrolyte. In this regard, removal of these inhibitors down to a level of less than 50 parts per million (ppm) can be accomplished by contacting these monomers and prepolymers with an inhibitor remover. Suitable inhibitor removers are commercially available.

In a preferred embodiment, the process of forming an electrolytic cell comprises the steps of coating the surface of a cathode with a composition comprising a solid matrix forming monomer, an inorganic ion salt and the solvent mixture of an organic carbonate, a glyme, and a solvent of Formula I–VI. The composition is then cured to provide for a solid electrolyte on the cathodic surface. The anode (e.g., a lithium foil) is then laminated to this composite product in such a way that the solid electrolyte is interposed between the lithium foil and the cathodic material.

This process can be reversed so that the surface of a anode is coated with a composition comprising a solid matrix forming monomer, an inorganic salt and the solvent represented by Formulas I–VI. The composition is then cured to provide for a solid electrolyte on the anodic surface. The cathode is then laminated to this composite product in such a way that the solid electrolyte is interposed between the lithium foil and the cathodic material.

Methods for preparing solid electrolytes and electrolytic cells are also set forth in U.S. Pat. Nos. 4,830,939 and 4,925,751 which are incorporated herein by reference in their entirety.

The solid, solvent-containing electrolytes described herein are particularly useful in preparing solid electrolytic cells having improved cumulative capacity compared to other solid, solvent-containing electrolytes.

While the invention has been described in terms of various preferred embodiments, the skilled artisan will appreciate that various modifications, substitutions, omissions and changes may be made without departing from the spirit thereof. The descriptions of subject matter in this disclosure are illustrative of the invention and are not intended to be construed as limitations upon the scope of the invention.

What is claimed is:

1. A solid electrolyte comprising:
a solid polymeric matrix;
an inorganic salt; and
a solvent represented by Formula I:

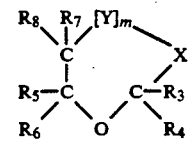

wherein m is an integer from 0 to 1; wherein X is selected from the group consisting of oxygen and $-(CR_1R_2)-$;

wherein Y is selected from the group consisting of oxygen and $-(CR_9R_{10})-$, but when Y is oxygen, X is $-(CR_1R_2)-$;

wherein $R_1$, $R_3$, $R_5$, $R_7$ and $R_9$ are hydrogen, and $R_2$, $R_6$, $R_8$ and $R_{10}$ are independently selected from the group consisting of hydrogen, alkyl and alkyloxy of from 1 to 4 carbon atoms; and wherein $R_4$ is selected from the group consisting of hydrogen, alkyl and alkoxy of from 1 to 4 carbon atoms, and $-CH_2O[CH_2CH_2O]_nCH_3$ where n is an integer from 0 to 3, with the proviso that when m=0, at least one of $R_2$, $R_4$, $R_6$ and $R_8$ is higher alkyl when $R_4$ is not $-CH_2O[CH_2CH_2O]_nCH_3$.

2. A solid electrolyte comprising:
a solid polymeric matrix;
an inorganic salt; and
a solvent represented by Formula II:

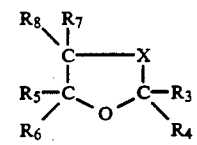

wherein X is selected from the group consisting of oxygen and $-(CR_1R_2)-$;

wherein $R_1$, $R_3$, $R_5$ and $R_7$ are hydrogen, and $R_2$, $R_6$ and $R_8$ are independently selected from the group consisting of hydrogen, and alkyl of from 1 to 4 carbon atoms;

wherein $R_4$ is selected from the group consisting of hydrogen, alkyl of 1 to 4 carbon atoms and $-CH_2O[CH_2CH_2O]_nCH_3$ where n is an integer from 0 to 3;

with the proviso that at least one of $R_2$, $R_4$, $R_6$ and $R_8$ is higher alkyl when $R_4$ is not $-CH_2O[CH_2CH_2O]_nCH_3$.

3. A solid electrolyte comprising:
a solid polymeric matrix;
an inorganic salt; and
a solvent represented by Formula III:

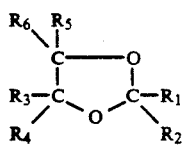

wherein $R_1$, $R_3$ and $R_5$ are hydrogen, and $R_4$ and $R_6$ are independently selected from the group consisting of hydrogen and alkyl of from 1 to 4 carbon atoms;

wherein $R_2$ is selected from the group consisting of hydrogen, alkyl of from 1 to 4 carbon atoms, and $-CH_2O[CH_2CH_2O]_nCH_3$, where n is an integer of from 0 to 3;

with the proviso that at least one of $R_2$, $R_4$ and $R_6$ is higher alkyl when $R_2$ is not $-CH_2O[CH_2CH_2O]_nCH_3$.

4. A solid electrolyte comprising:
a solid polymeric matrix;
an inorganic salt; and
a solvent represented by Formula IV:

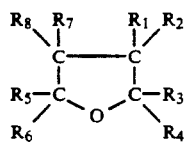

wherein $R_1$, $R_3$, $R_5$ and $R_7$ are hydrogen, and $R_2$, $R_6$ and $R_8$ are independently selected from the group consisting of hydrogen and alkyl of from 1 to 4 carbon atoms;

wherein $R_4$ is selected from the group consisting of hydrogen, alkyl of from 1 to 4 carbon atoms, and $-CH_2O[CH_2CH_2O]_nCH_3$, where n is an integer of from 0 to 3;

with the proviso that at least one of $R_2$, $R_4$, $R_6$ and $R_8$ is higher alkyl when $R_4$ is not $-CH_2O[CH_2CH_2O]_nCH_3$.

5. A solid electrolyte comprising:
a solid polymeric matrix;
an inorganic slat; and
a solvent represented by Formula V:

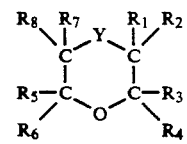

wherein Y is selected from the group consisting of oxygen and $(CR_9R_{10})$;

wherein $R_1$, $R_3$, $R_5$, $R_7$ and $R_9$ and hydrogen and $R_2$, $R_4$, $R_6$, $R_8$ and $R_{10}$ are independently selected from the group consisting of hydrogen, alkyl and alkoxy of from 1 to 4 carbon atoms and $-CH_2O[CH_2CH_2O]_nCH_3$, where n is an integer of from 0 to 3;

with the proviso that at least one of $R_2$, $R_4$, $R_6$, $R_8$ and $R_{10}$ is $-CH_2O[CH_2CH_2O]_nCH_3$, where n is an integer of from 0 to 3.

6. A solid electrolyte comprising:
a solid polymeric matrix;
an inorganic salt; and
a solvent represented by Formula VI:

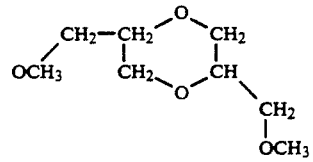

7. The solid electrolyte of claims 1, 2, 3, 4, 5 or 6 wherein said solvent comprises 10 to 90% by weight of an organic carbonate.

8. The solid electrolyte of claims 1, 2, 3, 4, 5 or 6 wherein said solvent comprises 10 to 90% by weight of a glyme selected from the group consisting of glyme, diglyme, triglyme and tetraglyme.

9. An electrolytic cell which comprises:
an anode containing a compatible anodic material;
a cathode containing a compatible cathodic material; and
interposed therebetween a solid electrolyte comprising:
a solid polymeric matrix;
an inorganic ion salt; and
a compatible solvent represented by Formula I

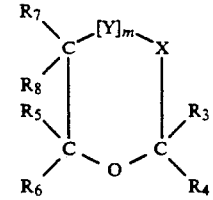

wherein m is an integer from 0 to 1;

wherein X is selected from the group consisting of oxygen and $-(CR_1R_2)-$;

wherein Y is selected from the group consisting of oxygen and $-(CR_9R_{10})-$, but when Y is oxygen, X is $-(CR_1R_2)-$;

wherein $R_1$, $R_3$, $R_5$, $R_7$ and $R_9$ are hydrogen, and $R_2$, $R_6$, $R_8$ and $R_{10}$ are independently selected from the group consisting of hydrogen, alkyl and alkyloxy of from 1 to 4 carbon atoms; and wherein $R_4$ is selected from the group consisting of hydrogen, alkyl and alkoxy of from 1 to 4 carbon atoms, and $-CH_2O[CH_2CH_2O]_nCH_3$ where in is an integer from 0 to 3, with the proviso that when m=0, at least one of $R_2$, $R_4$, $R_6$ and $R_8$ is higher alkyl when $R_4$ is not $-CH_2O[CH_2CH_2O]_nCH_3$.

10. An electrolytic cell which comprises:
an anode containing a compatible anodic material;
a cathode containing a compatible cathodic material; and
interposed therebetween a solid electrolyte comprising:
a solid polymeric matrix;
an inorganic ion salt; and
a compatible solvent represented by Formula II:

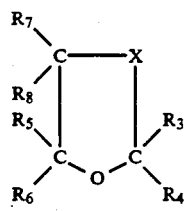

II.

wherein X is selected from the group consisting of oxygen and $-(CR_1R_2)-$;

wherein $R_1$, $R_3$, $R_5$ and $R_7$ are hydrogen, and $R_2$, $R_6$ and $R_8$ are independently selected from the group consisting of hydrogen, and alkyl of from 1 to 4 carbon atoms;

wherein $R_4$ is selected from the group consisting of hydrogen, alkyl of 1 to 4 carbon atoms and $-CH_2O[CH_2CH_2O]_nCH_3$ where n is an integer from 0 to 3;

with the proviso that at least one of $R_2$, $R_4$, $R_6$ and $R_8$ is higher alkyl when $R_4$ is not $-CH_2OH_2O]_nCH_3$.

11. An electrolytic cell which comprises:
an anode containing a compatible anodic material;
a cathode containing a compatible cathodic material; and
interposed therebetween a solid electrolyte comprising:
a solid polymeric matrix;
an inorganic ion salt; and
a compatible solvent represented by Formula III:

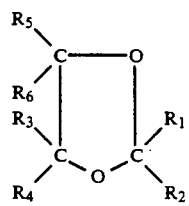

III.

wherein $R_1$, $R_3$ and $R_5$ are hydrogen, and $R_4$ and $R_6$ are independently selected from the group consisting of hydrogen and alkyl of from 1 to 4 carbon atoms;

wherein $R_2$ is selected from the group consisting of hydrogen, alkyl of from 1 to 4 carbon atoms, and $-CH_2O[CH_2CH_2O]_nCH_3$, where n is an integer of from 0 to 3;

with the proviso that at least one of $R_2$, $R_4$ and $R_6$ is higher alkyl when $R_2$ is not $-CH_2O[CH_2C-H_2O]_nCH_3$.

12. An electrolytic cell which comprises:
an anode containing a compatible anodic material;
a cathode containing a compatible cathodic material; and
interposed therebetween a solid electrolyte comprising:
a solid polymeric matrix;
an inorganic ion salt; and
a compatible solvent represented by Formula IV:

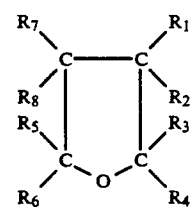

IV.

wherein $R_1$, $R_3$, $R_5$ and $R_7$ are hydrogen, and $R_2$, $R_6$ and $R_8$ are independently selected from the group consisting of hydrogen and alkyl of from 1 to 4 carbon atoms;

wherein $R_4$ is selected from the group consisting of hydrogen, alkyl of from 1 to 4 carbon atoms, and $-CH_2O[CH_2CH_2O]_nCH_3$, where n is an integer of from 0 to 3;

with the proviso that at least one of $R_2$, $R_4$, $R_6$ and $R_8$ is higher alkyl when $R_4$ is not $-CH_2O[CH_2H_2O]_nCH_3$.

13. An electrolytic cell which comprises:
an anode containing a compatible anodic material;
a cathode containing a compatible cathodic material; and
interposed therebetween a solid electrolyte comprising:
a solid polymeric matrix;
an inorganic ion salt; and
a compatible solvent represented by Formula V:

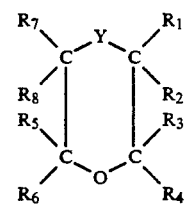

V.

wherein Y is selected from the group consisting of oxygen and $(CR_9R_{10})$;

wherein $R_1$, $R_3$, $R_5$, $R_7$ and $R_9$ and hydrogen and $R_2$, $R_4$, $R_6$, $R_8$ and $R_{10}$ are
independently selected from the group consisting of hydrogen, alkyl and alkoxy of from 1 to 4 carbon atoms and $-CH_2O[CH_2CH_2O]_nCH_3$, where n is an integer of from 0 to 3;

with the proviso that at least one of $R_2$, $R_4$, $R_6$, $R_8$ and $R_{10}$ is $-CH_2O[CH_2CH_2O]_nCH_3$, where n is an integer of from 0 to 3.

14. An electrolytic cell which comprises:
an anode containing a compatible anodic material;
a cathode containing a compatible cathodic material; and
interposed therebetween a solid electrolyte comprising:
a solid polymeric matrix;
an inorganic ion salt; and
a compatible solvent represented by Formula VI:

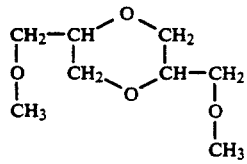

15. A battery comprising a plurality of electrolytic cells of claim 9, 10, 11, 12, 13 or 14.

16. A method of increasing the cycle lifetime of a solid electrolytic cell comprising an anode containing a compatible anodic material; a cathode containing a compatible cathodic material; and interposed therebetween a solid electrolyte which method comprises:
  selecting solid electrolyte comprising:
    a solid polymeric matrix; an inorganic ion salt; and a compatible solvent represented by Formula I:

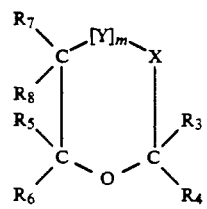

wherein m is an integer from 0 to 1;
  wherein X is selected from the group consisting of oxygen and $-(CR_1R_2)-$;
  wherein Y is selected from the group consisting of oxygen and $-(CR_9R_{10})-$, but when Y is oxygen, X is $-(CR_1R_2)-$;
  wherein $R_1$, $R_3$, $R_5$, $R_7$ and $R_9$ are hydrogen, and $R_2$, $R_6$, $R_8$ and $R_{10}$ are independently selected from the group consisting of hydrogen, alkyl and alkyloxy of from 1 to 4 carbon atoms; and
  wherein $R_4$ is selected from the group consisting of hydrogen, alkyl and alkoxy of from 1 to 4 carbon atoms, and $-CH_2O[CH_2CH_2O]_nCH_3$ where in is an integer from 0 to 3, with the proviso that when m=0, at least one of $R_2$, $R_4$, $R_6$ and $R_8$ is higher alkyl when $R_4$ is not $-CH_2O[CH_2CH_2O]_nCH_3$.

17. A method of increasing the cycle lifetime of a solid electrolytic cell comprising an anode containing a compatible anodic material; a cathode containing a compatible cathodic material; and interposed therebetween a solid electrolyte which method comprises:
  selecting a solid electrolyte comprising:
    a solid polymeric matrix; an inorganic ion salt; and a compatible solvent represented by Formula II:

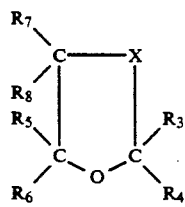

wherein X is selected from the group consisting of oxygen and $-(CR_1R_2)-$;
  wherein $R_1$, $R_3$, $R_5$ and $R_7$ are hydrogen, and $R_2$, $R_6$ and $R_8$ are independently selected from the group consisting of hydrogen, and alkyl of from 1 to 4 carbon atoms;
  wherein $R_4$ is selected from the group consisting of hydrogen, alkyl of 1 to 4 carbon atoms and $-CH_2O[CH_2CH_2O]_nCH_3$ where n is an integer from 0 to 3;
  with the proviso that at least one of $R_2$, $R_4$, $R_6$ and $R_8$ is higher alkyl when $R_4$ is not $-CH_2O[CH_2CH_2O]_nCH_3$.

18. A method of increasing the cycle lifetime of a solid electrolytic cell comprising an anode containing a compatible anodic material; a cathode containing a compatible cathodic material; and interposed therebetween a solid electrolyte which method comprises:
  selecting a solid electrolyte comprising:
    a solid polymeric matrix; an inorganic ion salt; and a compatible solvent represented by Formula III:

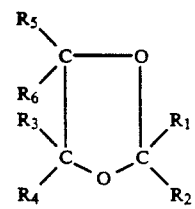

wherein $R_1$, $R_3$ and $R_5$ are hydrogen, and $R_4$ and $R_6$ are independently selected from the group consisting of hydrogen and alkyl of from 1 to 4 carbon atoms;
  wherein $R_2$ is selected from the group consisting of hydrogen, alkyl of from 1 to 4 carbon atoms, and $-CH_2O[CH_2CH_2O]_nCH_3$, where n is an integer of from 0 to 3;
  with the proviso that at least one of $R_2$, $R_4$ and $R_6$ is higher alkyl when $R_2$ is not $-CH_2O[CH_2CH_2O]_nCH_3$.

19. A method of increasing the cycle lifetime of a solid electrolytic cell comprising an anode containing a compatible anodic material; a cathode containing a compatible cathodic material; and interposed therebetween a solid electrolyte which method comprises:
  selecting a solid electrolyte comprising:
    a solid polymeric matrix; an inorganic ion salt; and a compatible solvent represented by Formula IV:

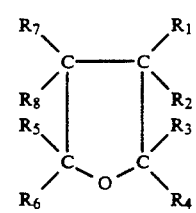

wherein $R_1$, $R_3$, $R_5$ and $R_7$ are hydrogen, and $R_2$, $R_6$ and $R_8$ are independently selected from the group consisting of hydrogen and alkyl of from 1 to 4 carbon atoms;
  wherein $R_4$ is selected from the group consisting of hydrogen, alkyl of from 1 to 4 carbon atoms, and $-CH_2O[CH_2CH_2O]_nCH_3$, where n is an integer of from 0 to 3;
  with the proviso that at least one of $R_2$, $R_4$, $R_6$ and $R_8$ is higher alkyl when $R_4$ is not $-CH_2O[CH_2CH_2O]_nCH_3$.

20. A method of increasing the cycle lifetime of a solid electrolytic cell comprising an anode containing a compatible anodic material; a cathode containing a compatible cathodic material; and interposed therebetween a solid electrolyte which method comprises:

selecting a solid electrolyte comprising:
a solid polymeric matrix; an inorganic ion salt; and a compatible solvent represented by Formula V:

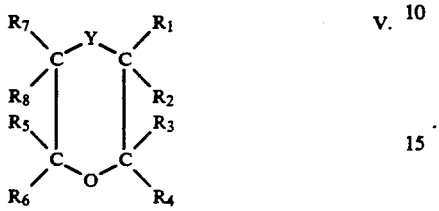

wherein Y is selected from the group consisting of oxygen and $(CR_9R_{10})$;

wherein $R_1$, $R_3$, $R_5$, $R_7$ and $R_9$ and hydrogen and $R_2$, $R_4$, $R_6$, $R_8$ and $R_{10}$ are independently selected from the group consisting of hydrogen, alkyl and alkoxy of from 1 to 4 carbon atoms and $-CH_2O[CH_2CH_2O]_nCH_3$, where n is an integer of from 0 to 3;

with the proviso that at least one of $R_2$, $R_4$, $R_6$, $R_8$ and $R_{10}$ is $-CH_2O[CH_2CH_2O]_nCH_3$, where n is an integer of from 0 to 3.

21. A method of increasing the cycle lifetime of a solid electrolytic cell comprising an anode containing a compatible anodic material, a cathode containing a compatible cathodic material; and interposed therebetween a solid electrolyte which method comprises:

selecting a solid electrolyte comprising:
a solid polymeric matrix; an inorganic ion salt; and a compatible solvent represented by Formula VI:

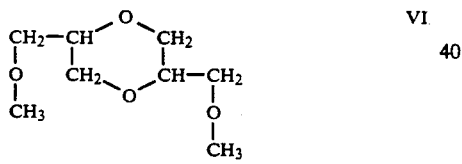

22. A cathode paste which comprises:
from about 35 to about 65 weight percent of a compatible cathodic material;
from about 1 to about 20 weight percent of an electroconductive agent;
from about 0 to about 20 weight percent of polyethylene oxide having a number average molecular weight of at least 100,000;
at least about 5 to 30 weight percent of a solid matrix forming monomer or partial polymer thereof, and from about 10 to about 50 weight percent of a compatible solvent represented by Formula I:

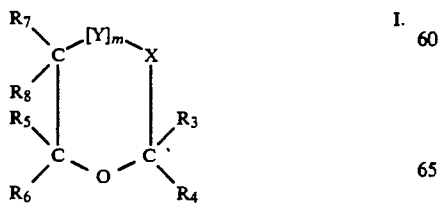

wherein m is an integer from 0 to 1;

wherein X is selected from the group consisting of oxygen and $-(CR_1R_2)-$;

wherein Y is selected from the group consisting of oxygen and $-(CR_9R_{10})-$, but when Y is oxygen, X is $-(CR_1R_2)-$;

wherein $R_1$, $R_3$, $R_5$, $R_7$ and $R_9$ are hydrogen, and $R_2$, $R_6$, $R_8$ and $R_{10}$ are independently selected from the group consisting of hydrogen, alkyl and alkyloxy of from 1 to 4 carbon atoms; and wherein $R_4$ is selected from the group consisting of hydrogen, alkyl and alkoxy of from 1 to 4 carbon atoms, and $-CH_2O[CH_2CH_2O]_nCH_3$ where in is an integer from 0 to 3, with the proviso that when m=0, at least one of $R_2$, $R_4$, $R_6$ and $R_8$ is higher alkyl when $R_4$ is not $-CH_2O[CH_2CH_2O]_nCH_3$.

23. A cathode paste which comprises:
from about 35 to about 65 weight percent of a compatible cathodic material;
from about 1 to about 20 weight percent of an electroconductive agent;
from about 0 to about 20 weight percent of polyethylene oxide having a number average molecular weight of at least 100,000;
at least about 5 to 30 weight percent of a solid matrix forming monomer or partial polymer thereof, and from about 10 to about 50 weight percent of a compatible solvent represented by Formula II:

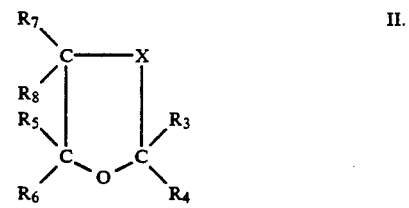

wherein X is selected from the group consisting of oxygen and $-(CR_1R_2)-$;

wherein $R_1$, $R_3$, $R_5$ and $R_7$ are hydrogen, and $R_2$, $R_6$ and $R_8$ are independently selected from the group consisting of hydrogen, and alkyl of from 1 to 4 carbon atoms;

wherein $R_4$ is selected from the group consisting of hydrogen, alkyl of 1 to 4 carbon atoms and $-CH_2O[CH_2CH_2O]_nCH_3$ where n is an integer from 0 to 3;

with the proviso that at least one of $R_2$, $R_4$, $R_6$ and $R_8$ is higher alkyl when $R_4$ is not $-CH_2O[CH_2CH_2O]_nCH_3$.

24. A cathode paste which comprises:
from about 35 to about 65 weight percent of a compatible cathodic material;
from about 1 to about 20 weight percent of an electroconductive agent;
from about 0 to about 20 weight percent of polyethylene oxide having a number average molecular weight of at least 100,000;
at least about 5 to 30 weight percent of a solid matrix forming monomer or partial polymer thereof, and from about 10 to about 50 weight percent of a compatible solvent represented by Formula III:

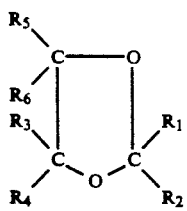

III.

wherein $R_1$, $R_3$ and $R_5$ are hydrogen, and $R_4$ and $R_6$ are independently selected from the group consisting of hydrogen and alkyl of from 1 to 4 carbon atoms;

wherein $R_2$ is selected from the group consisting of hydrogen, alkyl of from 1 to 4 carbon atoms, and $-CH_2O[CH_2CH_2O]_nCH_3$, where n is an integer of from 0 to 3;

with the proviso that at least one of $R_2$, $R_4$ and $R_6$ is higher alkyl when $R_2$ is not $-CH_2O[CH_2C-H_2O]_nCH_3$.

25. A cathode paste which comprises:

from about 35 to about 65 weight percent of a compatible cathodic material;

from about 1 to about 20 weight percent of an electroconductive agent;

from about 0 to about 20 weight percent of polyethylene oxide having a number average molecular weight of at least 100,000;

at least about 5 to 30 weight percent of a solid matrix forming monomer or partial polymer thereof, and from about 10 to about 50 weight percent of a compatible solvent represented by Formula IV:

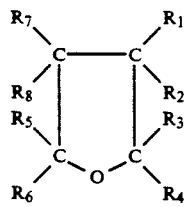

IV.

wherein $R_1$, $R_3$, $R_5$ and $R_7$ are hydrogen, and $R_2$, $R_6$ and $R_8$ are independently selected from the group consisting of hydrogen and alkyl of from 1 to 4 carbon atoms;

wherein $R_4$ is selected from the group consisting of hydrogen, alkyl of from 1 to 4 carbon atoms, and $-CH_2O[CH_2CH_2O]_nCH_3$, where n is an integer of from 0 to 3;

with the proviso that at least one of $R_2$, $R_4$, $R_6$ and $R_8$ is higher alkyl when $R_4$ is not $-CH_2O[CH_2C-H_2O]_nCH_3$.

26. A cathode paste which comprises:

from about 35 to about 65 weight percent of a compatible cathodic material;

from about 1 to about 20 weight percent of an electroconductive agent;

from about 0 to about 20 weight percent of polyethylene oxide having a number average molecular weight of at least 100,000;

at least about 5 to 30 weight percent of a solid matrix forming monomer or partial polymer thereof, and from about 10 to about 50 weight percent of a compatible solvent represented by Formula V:

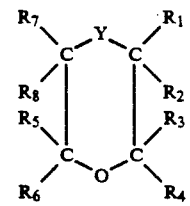

V.

wherein Y is selected from the group consisting of oxygen and $(CR_9R_{10})$;

wherein $R_1$, $R_3$, $R_5$, $R_7$ and $R_9$ and hydrogen and $R_2$, $R_4$, $R_6$, $R_8$ and $R_{10}$ are independently selected from the group consisting of hydrogen, alkyl and alkoxy of from 1 to 4 carbon atoms and $-CH_2O[CH_2C-H_2O]_nCH_3$, where n is an integer of from 0 to 3;

with the proviso that at least one of $R_2$, $R_4$, $R_6$, $R_8$ and $R_{10}$ is $-CH_2O[CH_2CH_2O]_nCH_3$, where n is an integer of from 0 to 3.

27. A cathode paste which comprises:

from about 35 to about 65 weight percent of a compatible cathodic material;

from about 1 to about 20 weight percent of an electroconductive agent;

from about 0 to about 20 weight percent of polyethylene oxide having a number average molecular weight of at least 100,000;

at least about 5 to 30 weight percent of a solid matrix forming monomer or partial polymer thereof, and from about 10 to about 50 weight percent of a compatible solvent represented by Formula VI:

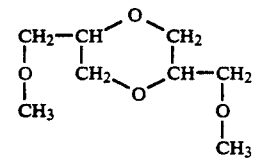

VI

28. A solid cathode which is the cured reaction product of claims 22, 23, 24, 25, 26 or 27.

* * * * *